(12) United States Patent
Roos et al.

(10) Patent No.: US 7,546,763 B2
(45) Date of Patent: Jun. 16, 2009

(54) METHOD AND SYSTEM FOR EXTENDING THE MOBILITY OF A VEHICLE

(75) Inventors: Gijsbert Roos, Clermont-Ferrand (FR); Pierre-Alain Begou, Clermont-Ferrand (FR); Jean-Claude Schoenhenz, Vic-le-Comte (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 519 days.

(21) Appl. No.: 11/138,690

(22) Filed: May 27, 2005

(65) Prior Publication Data

US 2005/0248107 A1 Nov. 10, 2005

Related U.S. Application Data

(63) Continuation of application No. PCT/EP03/13397, filed on Nov. 28, 2003.

(30) Foreign Application Priority Data

Nov. 28, 2002 (FR) .................................. 02 15093

(51) Int. Cl.
*G01M 17/02* (2006.01)
(52) U.S. Cl. ........................................ 73/146; 340/442
(58) Field of Classification Search ........ 73/146–146.8; 340/442–447
See application file for complete search history.

(56) References Cited

U.S. PATENT DOCUMENTS

| | | | |
|---|---|---|---|
| 3,826,322 A | 7/1974 | Williams | |
| 4,866,419 A | 9/1989 | Kyrtsos et al. | |
| 4,919,444 A | 4/1990 | Leiber et al. | |
| 5,247,831 A | 9/1993 | Fioravanti | |
| 5,968,294 A | 10/1999 | Willard, Jr. et al. | |
| 6,092,575 A | 7/2000 | Drieux et al. | |
| 6,183,010 B1 | 2/2001 | Daoud | |
| 6,418,992 B1 | 7/2002 | Drieux et al. | |
| 2004/0036206 A1 | 2/2004 | Loser et al. | |

FOREIGN PATENT DOCUMENTS

| | | |
|---|---|---|
| DE | 23 51 862 | 4/1975 |
| DE | 101 01 694 | 5/2002 |
| EP | 0 607 516 | 7/1994 |

(Continued)

OTHER PUBLICATIONS

Jurge, R.KJ.: 'Global '90 Cars: Electronics-Aided', (Dec. 1, 1989), No. 12 (pp. 45-49), IEEE Spectrum, IEEE Inc., NY.

*Primary Examiner*—Andre J. Allen
*Assistant Examiner*—Jermaine Jenkins
(74) *Attorney, Agent, or Firm*—Buchanan Ingersoll & Rooney PC

(57) ABSTRACT

The mobility of a vehicle having first and second pairs of diagonally opposite wheels is extended when the pressure on a given wheel is abnormally low. A load on the first pair of wheels defines a first load diagonal, and a load on the second pair of wheels defines a second load diagonal. A disequilibrium between the first and second load diagonals is induced by actuation of a level corrector comprised of at least two actuators each acting on a respective side of the vehicle, for reducing a load borne by said given wheel and thereby extending the mobility thereof.

12 Claims, 1 Drawing Sheet

FOREIGN PATENT DOCUMENTS

| | | |
|---|---|---|
| EP | 0 695 567 | 2/1996 |
| GB | 2233939 A * | 1/1991 |
| GB | 2 358 004 | 7/2001 |
| JP | 61102303 | 5/1986 |
| JP | 02175403 | 7/1990 |
| JP | 07047829 | 2/1995 |
| JP | 09099723 | 4/1997 |

* cited by examiner

METHOD AND SYSTEM FOR EXTENDING THE MOBILITY OF A VEHICLE

This application is a continuation of International PCT/EP03/013397 filed on Nov. 28, 2003, which claims priority from French Application No. 02/15093 filed on Nov. 28, 2002.

BACKGROUND OF THE INVENTION

The present invention concerns the tyres and ground contact system of automobiles, in particular the suspension system and more particularly the load distribution on the wheels.

Vehicle tyres are designed for normal operation while pressurised internally by a gas, usually air. However, it can happen that after a pressure loss they have to operate at reduced or even zero pressure. In the case of a conventional tyre, operation at reduced or zero pressure has two main consequences. The first consequence is that the vehicle becomes difficult to steer, uncomfortable, or unstable. The second consequence is irreversible damage to the tyre, which quickly becomes irreparable, sometimes after travelling only a few tens of metres.

Tyres or systems for passenger cars are known, which can operate at reduced or zero pressure to ensure or extend the mobility of the vehicle compared with a conventional tyre, for example after a puncture. These tyres or systems are commonly known as "run flat" because they are able to run when they are flat. One of the concepts that make this possible is based on high rigidity of the sidewalls, which can then work under radial compression and support the tread. This concept is known as "ZP" (Zero Pressure). U.S. Pat. No. 5,968,294 describes such a tyre. Another concept (see U.S. Pat. No. 6,092,575 and U.S. Pat. No. 6,418,992) uses a support located inside the tyre to limit its deflection. The system offered commercially under the name "Pax System" is an example of this concept's implementation. Solutions of those types make it possible to travel a considerable distance after a puncture, for example 200 km, at a limited speed for example of 80 km/h. This enables the user of the vehicle to continue his journey normally and repair the tyre later, whereas a conventional tyre that is punctured must be changed immediately if it is to avoid irreparable damage. Thus, the mobility of the vehicle is greatly extended.

SUMMARY OF THE INVENTION

One of the present invention's objectives is to extend the mobility of vehicles still further, in particular that of vehicles fitted with "run flat" tyres, to enable them to travel an even greater distance (for example 500 or even 1000 km) and/or to run at a higher speed (for example 100, 110 or 120 km/h) without necessarily modifying the tyre, the tyre-wheel assembly or the system (tyre, wheel and support, as the case may be). Another objective of the invention is to preserve the current performances of "run flat" systems in terms of mobility while improving other performances such as comfort, noise and rolling resistance, by challenging the current compromise in the design of "run flat" tyres.

These objectives are achieved by the method of the invention, which consists in reducing substantially the load borne by a vehicle wheel when the tyre on that wheel is under an abnormally low pressure.

BRIEF DESCRIPTION OF THE DRAWINGS

FIG. 1 shows an example of the load distribution on the four wheels of a vehicle. The total load, corresponding to the mass of the vehicle in normal driving condition, is for example of the order of 1600 DaN. Here, that load is shared equally between the four wheels, i.e. on flat ground each wheel carries 400 DaN. A pair of wheels diagonally opposite one another are referred to as a "diagonal". The pair consisting of the left front wheel (LF) and the right rear wheel (RR) constitutes the diagonal LF-RR and the pair consisting of the right front wheel (RF) and the left rear wheel (LR) constitutes the diagonal RF-LR. In this example each diagonal supports 800 DaN, corresponding to the "ideal" case when the ground is flat and the vehicle's suspension system is correctly adjusted.

DESCRIPTION OF PREFERRED EMBODIMENTS

Figure 1:
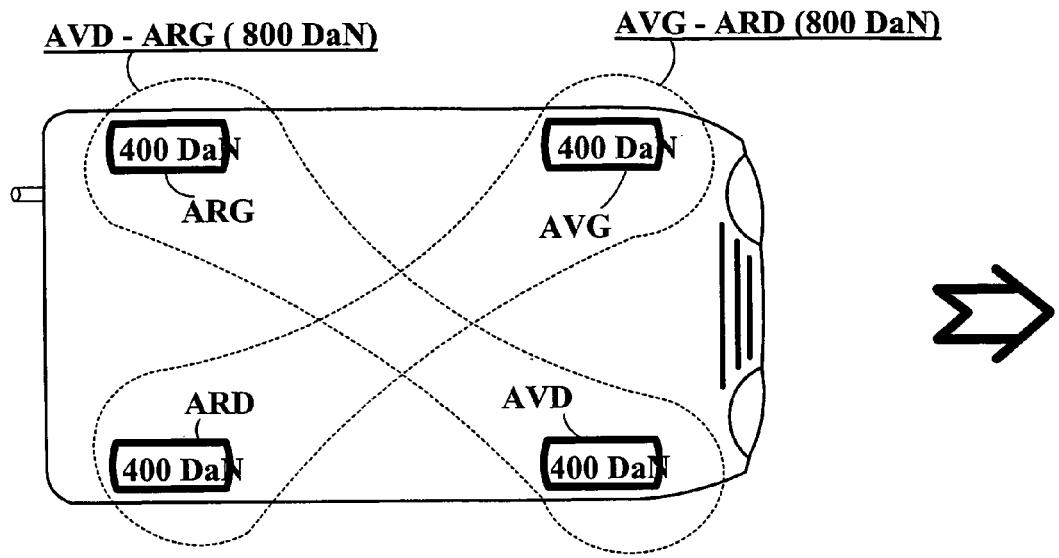
FIG. 1 schematically shows an example of a load distribution on the four wheels of a vehicle.
Figure 2:
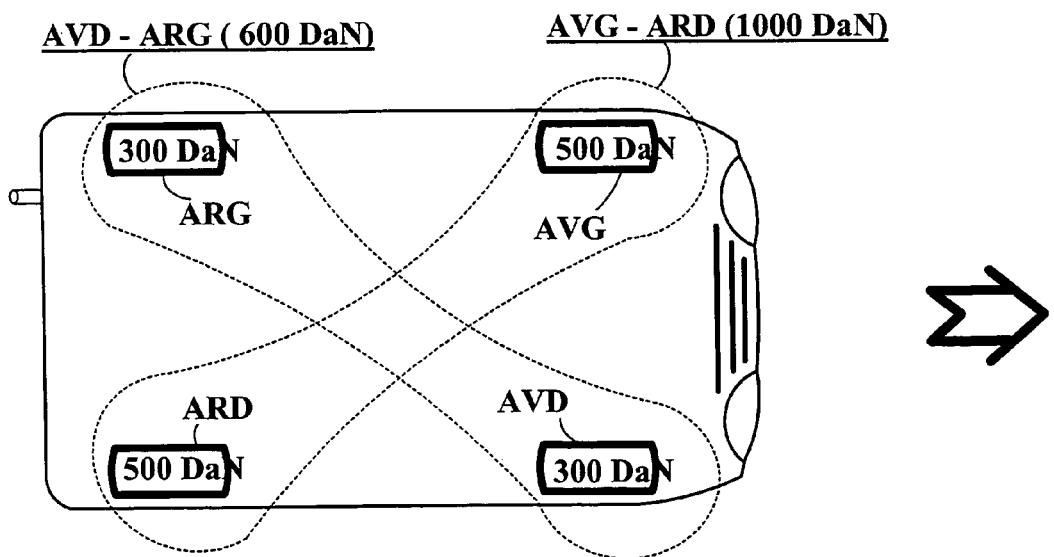
FIG. 2 schematically shows another example of a load distribution on the four wheels of a vehicle.

In contrast, if one of the wheels is carrying a higher load because it is resting on a hump in the ground or because the suspension spring of that wheel is more highly prestressed (for example due to incorrect adjustment), the distribution will be different. Let us consider for example the same vehicle (shown in FIG. 2) as that of FIG. 1, but whose left front wheel (LF) is now carrying 500 DaN. Transverse and longitudinal equilibrium of the vehicle (whose total load remains the same) will then only be possible if the right rear wheel (RR) is also carrying 500 DaN. So the diagonal LF-RR will be carrying 1000 DaN and the diagonal RF-LR will be carrying 600 DaN. The diagonals are no longer in equilibrium relative to one another but the vehicle as a whole is in equilibrium.

This simplified example clearly illustrates the fact that for a given mass and mass distribution, if the load on one wheel increases, the load on the other wheel of the corresponding diagonal also increases, and the load on the wheels of the other diagonal decreases. Naturally, and conversely, when the load on one wheel decreases the load on the other wheel of the corresponding diagonal also decreases, whereas the load on the wheels of the other diagonal increases. Thus, the invention proposes to make use of a deliberately induced disequilibrium of the diagonals to reduce substantially the load on the damaged wheel (i.e. the wheel with the tyre whose pressure is insufficient).

Preferably, the method of the invention consists in acting simultaneously on the two wheels of a diagonal and, more preferably still, on the two wheels of the diagonal whose tyres are at normal pressure, so that the damaged diagonal carries a much lower load compared with the undamaged diagonal. By acting on two wheels simultaneously, a greater reduction of the load borne by the damaged tyre can be obtained while restricting the static roll of the vehicle.

Many different ways of implementing the invention can be imagined. For example, in vehicles fitted with an at least semi-active suspension system, i.e. a suspension which enables a modification, control or regulation of the vertical force transmitted between the wheel and the body, the method consists in using the suspension to reduce the load on the damaged wheel in a permanent or only episodic manner, for example by varying the stiffness or prestress of the suspension springs (for example pneumatic) and/or the shock absorbers. "Episodic reduction" is understood to mean a reduction which is not permanent throughout the running time of the damaged wheel. An episodic reduction can for example enable the mean load to be reduced and/or load peaks to be limited.

An example of a preferred semi-active suspension system is the hydro-pneumatic system (used for example on some Citroen vehicle models) in which the quantity of oil can be modified so as to vary the suspension height.

Another example is that of the pneumatic suspensions in which, since the suspension spring is pneumatic, the quantity of gas or the volume of the chamber can be modified so as to control the height and/or the force transmitted.

Another way to implement the method of the invention consists in using an anti-roll device to affect the left-right load distribution on an axle, preferably the left-right load distribution on the undamaged axle (i.e. the axle not supporting the damaged wheel).

Another preferred way to implement the method of the invention consists in using an anti-roll device to affect both the left-right load distribution on the damaged axle and, at the same time, in the same way but in the opposite direction, the left-right load distribution on the undamaged axle.

More preferably still, the method of the invention consists in using an active anti-roll device for the effect to be produced. An example of a preferred active anti-roll device is described in the application WO 99/67100. That document concerns a rotary jack which controls the anti-roll torque in the cross-member. Alternatively, the variation of the torque in the anti-roll cross-member can be controlled by varying the length of one of the rods connecting the cross-member to the moving elements of the suspension. For example, that length can be modified by a screw-type telescopic system and an electric motor.

Numerous current vehicles are equipped with a device which affects the relation between the vertical force and the deflection of the wheels on an axle (generally the rear axle) to correct the level of the vehicle. Such a device is commonly called a "level corrector". Most often, level correctors comprise an actuator for each side of the axle, the two actuators being controlled by a single means. Another way to implement the method of the invention if the vehicle is equipped with a level corrector comprising independent actuators for each side of the vehicle, is to use the said actuators to modify the load distribution. In this way either the load on the damaged wheel can be reduced directly (by acting on that wheel by means of the corresponding actuator), or the load on the damaged wheel can be reduced indirectly by reducing the load on the opposite wheel of the undamaged axis, which reduces the load on the damaged diagonal. Reducing a wheel load by means of a level corrector can preferably consist in "raising" the body by means of the opposite wheel on the same axle and/or by means of the wheel of the other axle on the same side. But it can also consist in "lowering" the body to the level of the damaged wheel or of the other wheel of the same diagonal. "Raising" the body generally consists in increasing the prestress of a spring (for example the pressure of a pneumatic spring), while "lowering" the body generally consists in reducing the prestress of the spring. The use of one or other solution can have practically the same effect on the load variation, but has a completely different effect on the level of the vehicle.

The load variation sought can also be obtained by means of a screw mechanism arranged in series with the suspension spring and controlled for example by an electric motor. Alternatively, hydraulic jacks can replace the screw mechanism and its motor, for example in accordance with the principle of the "Active Body Control" system used in vehicles marketed under the trade name Mercedes.

Still another way to implement the method of the invention consists in preventing the suspension of at least one of the wheels of the damaged diagonal from expanding normally. For this, for example a simple mechanical device such as a retractable expansion abutment can be used, which only comes into action in the event of a puncture. This function can also be integrated in the shock absorber, in which the hydraulic flow is blocked or reduced during expansion. This produces an at least episodic reduction of the load. Conversely, by reducing (or suppressing) the shock-absorbing force in compression, a substantial reduction of load peaks and also of the mean load during flat rolling can be obtained.

Another way to implement the method of the invention consists in providing a ratchet system (which is only activated in the event of a puncture) and which maintains a stress in the suspension, taking advantage of the fact that the said stress has been generated at one time in the suspension during running flat (for example due to roll or any vertical deflection). It can be said that the system takes advantage of a large deflection that follows the detection of an insufficient pressure to limit the rebound stroke and so to maintain the reduced wheel load. Preferably, such a system can act via the anti-roll device. An advantage of such a system is that it uses the forces and energy of the ground contact system for passive operation.

The stiffness in the suspension can also be modified by the insertion of an additional spring in series (reduction of stiffness) or in parallel (increase of stiffness), without energy input.

In contrast, yet another way to implement the method of the invention is to supply energy for a short instant, to modify the vehicle's equilibrium. For this a dedicated system can be used, such as a pyrotechnic element designed to elongate lastingly one of the rods of the anti-roll link, a gas cartridge in the shock-absorber that modifies the equilibrium, or the release of an additional spring (which acts for example on a rod of the anti-roll system).

Surprisingly, it was found that a 10% load reduction could allow a very substantial increase of mobility, for example well above 10% for the criterion of distance or maximum admissible speed.

The invention also concerns a system for implementing the method of the invention. The system of the invention comprises means for detecting the under-inflated state of a tyre of the vehicle and means (such as those described earlier) that allow the load carried by the said tyre to be reduced, the load reduction being triggered by the detection of the under-inflation.

The invention also concerns a vehicle equipped with the system according to the invention.

The invention can also to some extent provide an extension of the mobility of conventional tyres, for example by allowing the vehicle to roll with one wheel at zero pressure for some kilometres at low speed, until it reaches a safe area where the tyre can be repaired or replaced without problems. Thus, the virtually zero mobility offered by a conventional tyre is substantially extended.

The invention claimed is:

1. Method for extending the mobility of a four-wheel vehicle comprising acting on a load distribution among the four wheels by actuation of a level corrector comprised of at least two actuators each acting on a respective side of the vehicle for reducing a load borne by a given wheel of the vehicle when the pressure in the tire of the given wheel is abnormally low.

2. System for implementing the method according to claim 1, comprising means for detecting an abnormally low pressure in a tire and means for actuating the level corrector.

3. System according to claim 2, also comprising means for alerting a driver of the vehicle.

4. Method according to claim 1 wherein the load reduction on the given wheel comprises a reduction of a mean static load on the given wheel by at least 10%.

5. Method according to claim 1 wherein the load reduction on the given wheel comprises a reduction of a mean static load on the given wheel by at least 30%.

6. Method according to claim 1 wherein the actuators comprise pneumatic actuators.

7. Method for extending the mobility of a vehicle having first and second pairs of diagonally opposite wheels; a load on the first pair of wheels defining a first load diagonal, and a load on the second pair of wheels defining a second load diagonal, wherein a tire on a given wheel has an abnormally low pressure, the method comprising inducing a disequilibrium between the first and second load diagonals by actuation of a level corrector comprised of at least two actuators each acting on a respective side of the vehicle, for reducing a load borne by said given wheel.

8. Method according to claim 7 wherein the load reduction on the given wheel comprises a reduction of a mean static load on the given wheel by at least 10%.

9. Method according to claim 7 wherein the load reduction the given wheel comprises a reduction of a mean static load on the given wheel by at least 30%.

10. Method according to claim 7 wherein the actuators comprise pneumatic actuators.

11. A system for implementing the method according to claim 7 including means for detecting the abnormally low pressure in the tire of a given wheel, and means for initiating the actuation of the level corrector.

12. System according to claim 7 further including means for alerting a driver of the vehicle.

* * * * *